United States Patent [19]

Ams et al.

[11] Patent Number: 4,974,936
[45] Date of Patent: Dec. 4, 1990

[54] DEVICE FOR SUPPLYING LIGHT TO ENDOSCOPES WITH ROTARY FILTER PLATE AND FASTER ROTATING RUNNER PLATE WITH AT LEAST ONE OPAQUE REGION

[75] Inventors: Felix Ams, Kämpfelbach; Michael Vögele, Kämpfelbach-Ersingen, both of Fed. Rep. of Germany

[73] Assignee: Richard Wolf GmbH, Knittlingen, Fed. Rep. of Germany

[21] Appl. No.: 484,712

[22] Filed: Feb. 23, 1990

[30] Foreign Application Priority Data

Mar. 15, 1989 [DE] Fed. Rep. of Germany ....... 3908366

[51] Int. Cl.$^5$ .................... G02B 5/20; G02B 23/24; G02B 26/04; A61B 1/04
[52] U.S. Cl. .................... 350/315; 350/317; 350/274; 358/98; 358/42; 126/6
[58] Field of Search ............... 350/315, 317, 274, 268; 358/98, 42; 126/6; 362/293; 250/233

[56] References Cited

U.S. PATENT DOCUMENTS

| 4,165,919 | 8/1979 | Little | 350/317 |
| 4,807,026 | 2/1989 | Nishioka et al. | 358/42 |
| 4,816,909 | 3/1984 | Kimura et al. | 358/42 |
| 4,866,526 | 9/1989 | Ams et al. | 128/6 |
| 4,909,600 | 3/1990 | Ciarlei et al. | 350/315 |
| 4,914,556 | 4/1990 | Richardson | 350/315 |

Primary Examiner—Jon W. Henry
Attorney, Agent, or Firm—Panitch Schwarze Jacob & Nadel

[57] ABSTRACT

In a device for supplying light to endoscopes, in particular video endoscopes, the light is passed from a light source by way of a revolving filter plate with areas of primary colors, and a runner wheel, to a photoconductor of the endoscope, for illuminating an object to be examined, the colored image of which is passed to the video endoscope. The runner wheel rotates faster than the filter plate so that the beam of light on passing each transition from one colored area of the filter plate to another is covered by an opaque region of the runner wheel.

3 Claims, 2 Drawing Sheets

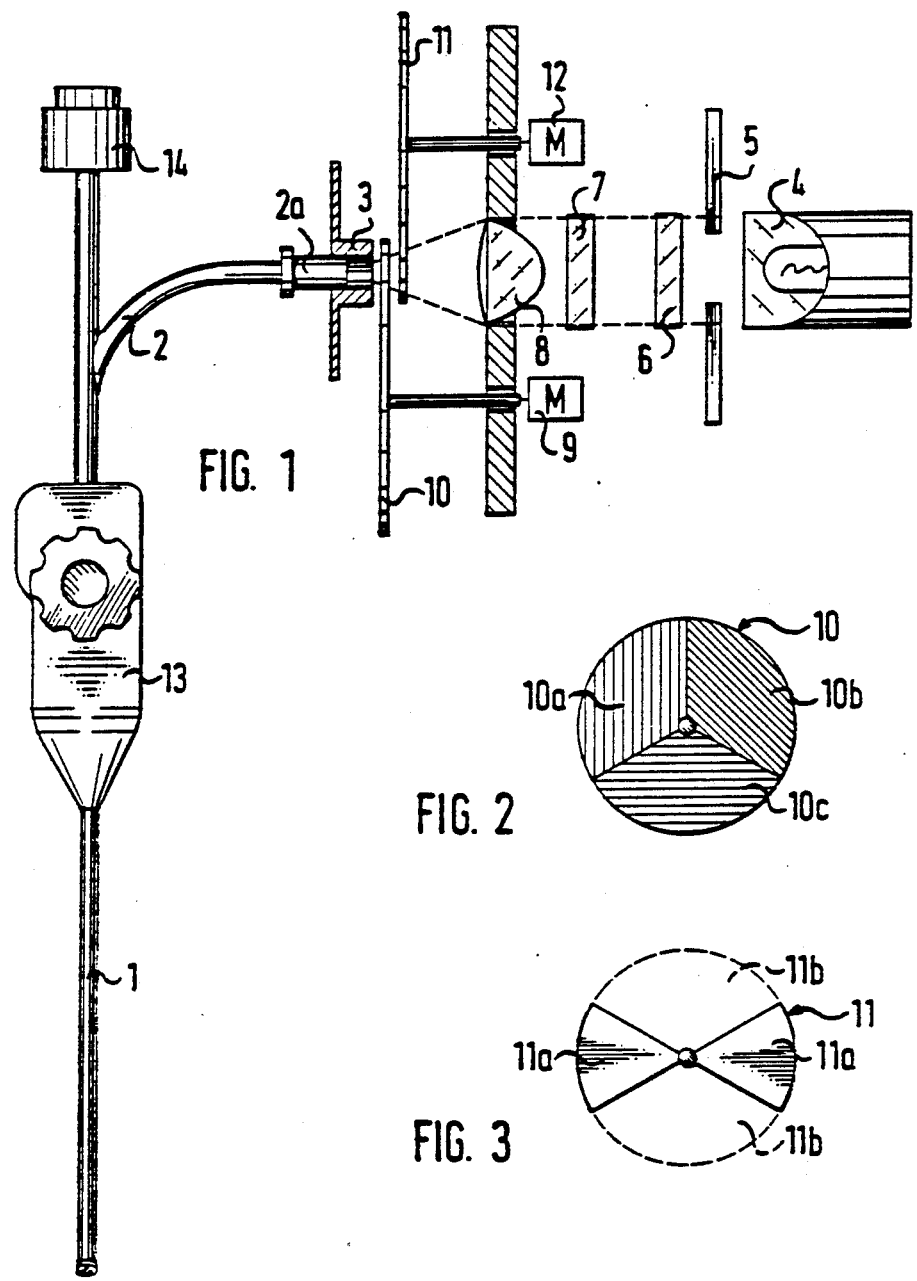
FIG. 1
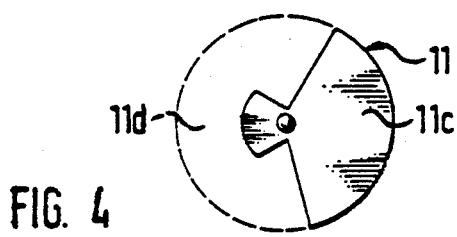
FIG. 2
FIG. 3
FIG. 4

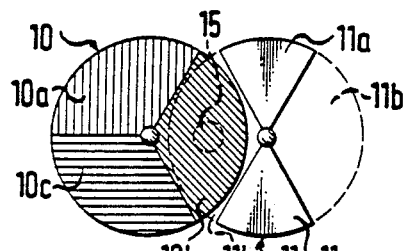 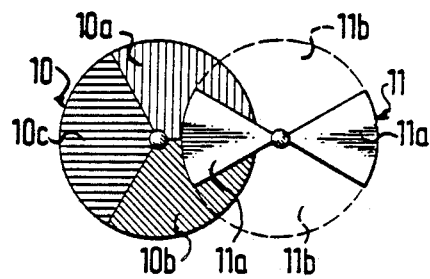
FIG. 5   FIG. 6
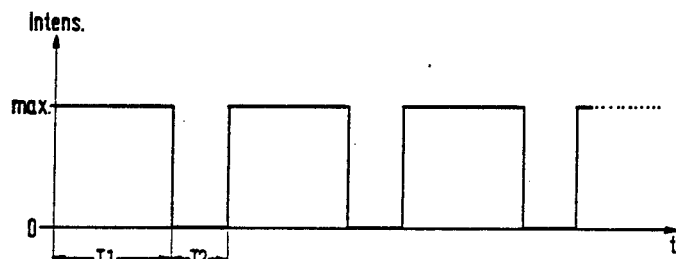
FIG. 7
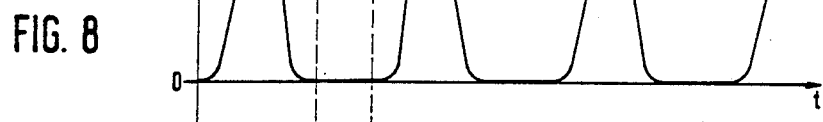
FIG. 8
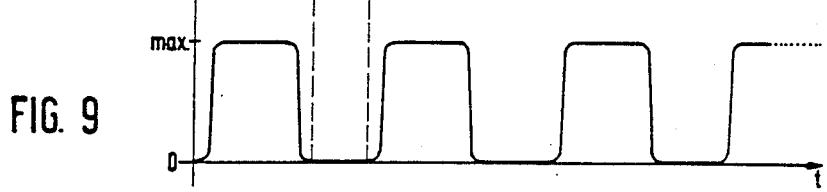
FIG. 9

DEVICE FOR SUPPLYING LIGHT TO ENDOSCOPES WITH ROTARY FILTER PLATE AND FASTER ROTATING RUNNER PLATE WITH AT LEAST ONE OPAQUE REGION

FIELD OF THE INVENTION

This invention relates to a device for supplying light to endoscopes, in particular video endoscopes.

BACKGROUND OF THE INVENTION

There is disclosed in DE-B-No. 36 31 927, such a light supply device in which light is radiated from a light source to the proximal end of a photo-conductor of an endoscope through a revolving filter plate with the primary colour areas impermeable to light, and permeable to light, for illuminating an object to be examined.

Such a device has the disadvantage that because the transition period between the bright phase and the dark phase is relatively lengthly, the time during which the radiated light is of maximum intensity is restricted to the extent that the resulting light losses cause impairment of the image transmission.

SUMMARY OF THE INVENTION

It is an object of the present invention to adapt the light intensity in devices of the type referred to above to follow an ideal illumination curve, that is to say to reduce the transition period between the illumination phase and the covering or screening phase.

According to the present invention in a device for the supply of light to endoscopes, in particular video endoscopes, in which light is radiated from a light source onto the proximal end of a photo-conductor of an endoscope through a revolving filter plate, having opaque and transparent coloured areas, of the three primary colours, for illuminating an object to be examined, the opaque areas consist of at least one region of a runner wheel engaging in the path of a light beam to the filter plate, the runner wheel revolving at a higher rate of rotation than the filter plate, so that in each case the light beam upon passing the transition from one coloured area of the filter plate to the other is covered by the opaque area of the runner wheel. Thus, the rising and falling flanks of the illumination curve are very steep because the transition times between the bright and the dark phases are reduced.

BRIEF DESCRIPTION OF THE DRAWINGS

FIG. 1 is a diagram of a light supply unit coupled to a flexible endoscope which is shown diagrammatically in elevation;

FIG. 2 is a plan view of a colour filter plate;

FIG. 3 is a plan view of a runner wheel according to a first embodiment of the invention;

FIG. 4 is a plan view of a runner wheel according to a second embodiment of the invention;

FIG. 5 is a plan view of the filter plate of FIG. 2 in cooperation with the runner wheel of FIG. 3, upon the passage of light through the filter plate and a cut-out of the runner wheel;

FIG. 6 is a similar view to that of FIG. 5 illustrating the screening of a transition between coloured areas of the filter plate, by an opaque region of the runner wheel;

FIG. 7 is a graph illustrating an ideal illumination curve;

FIG. 8 is a graph illustrating an illumination curve produced without the use of a runner wheel; and FIG. 9 is a graph illustrating an illumination curve produced with the use of a runner wheel according to FIG. 3.

DETAILED DESCRIPTION OF THE INVENTION

The device for the supply of light to an endoscope, in particular to a video endoscope (FIG. 1), comprises a flexible, distal, insertion piece 1, through which runs a photoconductor 2, which can be coupled by means of a plug 2a at its proximal end to a plug socket 3. A light beam emitted by a light source 4 is guided into the proximal end of the photoconductor 2 by way of an aperture 5, an infrared filter 6, a colour correction filter 7 and a focus lens 8.

Immediately in front of the proximal end of the photoconductor 2, there extends transversely of the light beam 15 a filter plate 10, which is rotatable by means of a motor 9. The plate 10 has three primary colour areas 10a, 10b and 10c, (FIG. 2) there being supported in parallel therewith a screening runner wheel 11, which is rotatable by means of a motor 12.

The light from the light source 4 emerges by way of the coloured filter plate 10 and the photoconductor 2, at the distal end of the insertion piece 1 for the coloured illumination of an object to be examined, the image of which is passed by way of an image conductor to an endoscope, in particular a video endoscope 13, having multi-function connection 14 for the supply to the video endoscope, of air and flushing fluid and also for the transmission of the video-and control signals.

The runner wheel 11 cooperates with the filter plate 10 of FIGS. 1 and 2. According to FIG. 3, the wheel 11 has two opaque area regions in the form of sectors 11a and two cutouts 11b, or according to FIG. 4, only one opaque sector 11c and one cutout 11d. When a filter plate 10 with three primary colours, red, green and blue, is used with a wheel 11 according to FIG. 3, the filter plate 10 is rotated at a rotation rate $n_1$ for example according to the 625 line standard where $n_1 = 1500$ r.p.m., which corresponds to a frequency of 25 frames per second. In the position of rest (FIG. 6) of this filter plate 10 and this runner wheel 11, an opaque area sector 11a of the runner wheel 11 overlaps one of the three transition zones between the three primary colour areas of the filter plate 10. Given the rotation rate $n_1$ of the filter plate 10, the runner wheel must be rotated at a rate of $n_2 = 1.5 \cdot n_1$, so that said transition zones of the filter plate 10 are covered at each revolution, so that after each transition zone has been covered, the light beam, which is referenced 15 in FIG. 5, can be used freely for illumination through one of the two cutouts 11b and one of the filtering area sectors 10a, 10b, or 10c.

The runner wheel 11 of FIG. 4, must be rotated at a rate of $n_2 = 3 \cdot n_1$.

Generally then the formula $n_2/n_1 = x/y$ or $n_2 =$ $$\frac{x \cdot n_1}{y},$$

applies, where x is the number of filter colour areas and y is the number of opaque runner wheel sectors 11a.

By virtue of the higher rate of rotation of the runner wheel, the angular velocity also increases, thereby affording shorter bright-dark transition times and consequently a steeper illumination curve as shown in FIG. 9, which approximates to the theoretically ideal illumination curve which is shown in FIG. 7 and which provides a substantial improvement over the illumination curve shown in FIG. 8 produced without the use of a runner wheel.

The runner wheel may consist of a thin plate having at least one cutout and at least one opaque region.

The runner wheel may consist of a transparent plate, having a light impermeable covering providing the opaque regions.

What is claimed is:

1. A device for supplying light to endoscopes, said device comprising;

means for guiding a light beam from a light source onto a proximal end of a photoconductor of an endoscope;

a rotary filter plate supported for interposition between said light guiding means and said proximal end to interrupt said light beam, said filter plate having light permeable areas of the three primary colours;

means for rotating said filter plate at a first rate of rotation;

a runner wheel having at least an opaque region and being supported for rotation to interpose such region in the path of said light beam, between said light guiding means and said filter plate; and means for rotating said runner wheel at a second rate of rotation exceeding said first rate of rotation so that as said filter plate is rotated and said light beam thus passes respective transitions from one of said coloured areas to another, said light beam is interrupted in each case by said opaque region.

2. A device as claimed in claim 1, wherein said runner wheel comprises a thin plate having at least one cutout and at least one opaque region.

3. A device as claimed in claim 1, wherein said runner wheel comprises a transparent plate and a light impermeable covering providing a plurality of opaque regions.

* * * * *